(12) United States Patent
Wakimoto et al.

(10) Patent No.: US 10,256,456 B2
(45) Date of Patent: Apr. 9, 2019

(54) RECTANGULAR SECONDARY BATTERY AND METHOD OF MAKING THE SAME

(71) Applicant: SANYO Electric Co., Ltd., Daito-shi, Osaka (JP)

(72) Inventors: Ryoichi Wakimoto, Hyogo (JP); Hiromasa Nishijima, Osaka (JP); Yasuhiro Yamauchi, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 545 days.

(21) Appl. No.: 14/803,340

(22) Filed: Jul. 20, 2015

(65) Prior Publication Data

US 2016/0043380 A1   Feb. 11, 2016

(30) Foreign Application Priority Data

Aug. 7, 2014   (JP) .................................. 2014-161109

(51) Int. Cl.
*H01M 2/34* (2006.01)

(52) U.S. Cl.
CPC .................................. *H01M 2/345* (2013.01)

(58) Field of Classification Search
CPC .................................................... H01M 2/345
See application file for complete search history.

(56) References Cited

U.S. PATENT DOCUMENTS

| 2008/0038627 | A1  | 2/2008 | Yamauchi et al. |
| 2008/0038628 | A1  | 2/2008 | Yamauchi et al. |
| 2010/0015508 | A1* | 1/2010 | Hwang ............... H01M 2/0426 429/56 |
| 2010/0233529 | A1  | 9/2010 | Nansaka et al. |
| 2013/0196185 | A1* | 8/2013 | Yokoyama ............. H01M 2/06 429/53 |

FOREIGN PATENT DOCUMENTS

| JP | 2008-66254 A  | 3/2008 |
| JP | 2008-66255 A  | 3/2008 |
| JP | 2010-212034 A | 9/2010 |

* cited by examiner

*Primary Examiner* — James Lee
(74) *Attorney, Agent, or Firm* — Westerman, Hattori, Daniels & Adrian, LLP

(57) ABSTRACT

A rectangular secondary battery according to the present invention includes an electroconductive member, a first insulating member, a pressure-sensitive circuit breaker that includes an inversion plate and a positive electrode current collector. The electroconductive member has a first outer side surface and a second outer side surface that face away from each other. The first insulating member includes a pair of short side walls. One of the short side walls is located outside of the first outer side surface and presses the first outer side surface toward the second outer side surface. The other short side wall is located outside of the second outer side surface and presses the second outer side surface toward the first outer side surface.

21 Claims, 14 Drawing Sheets

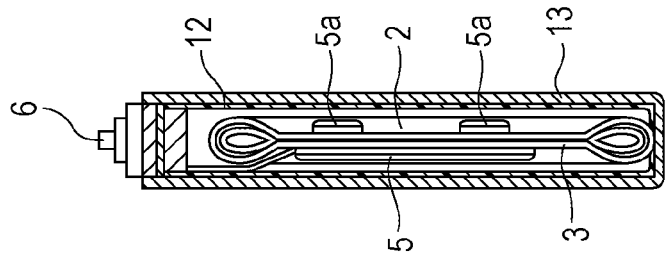
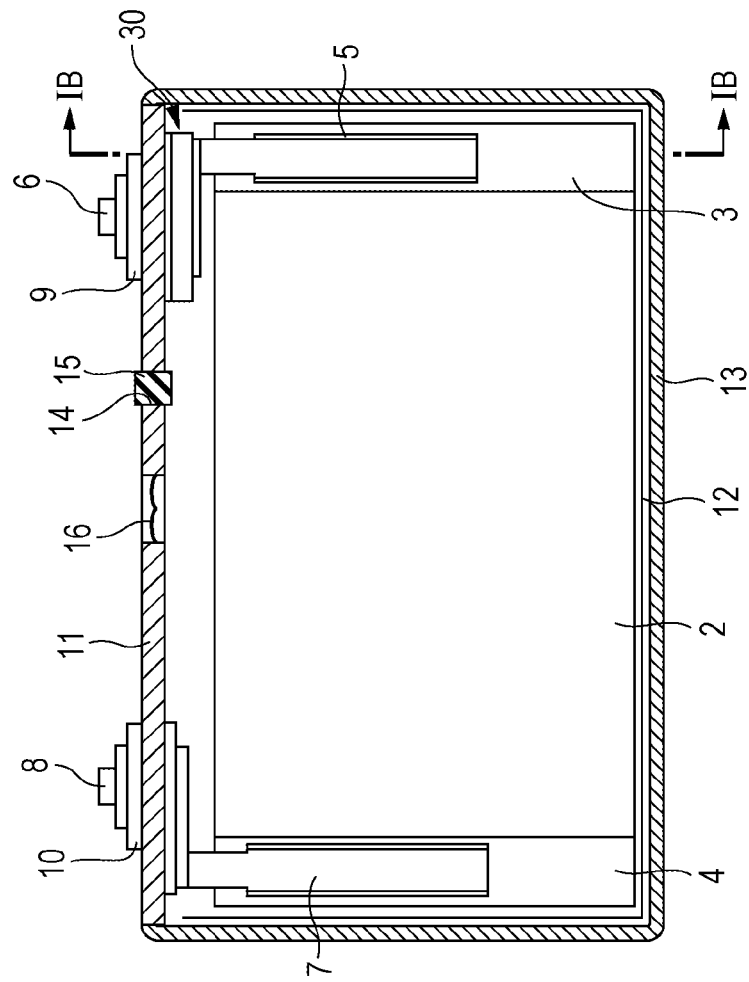

Figure 12
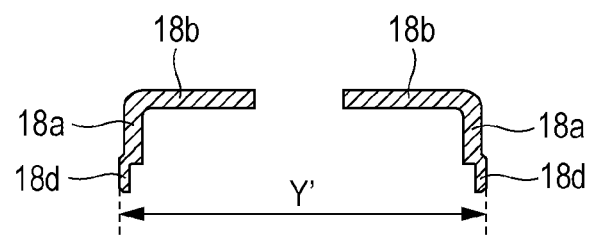
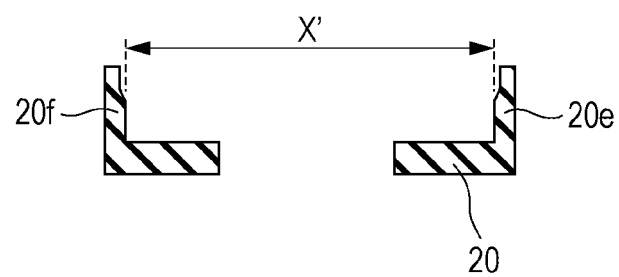
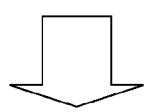
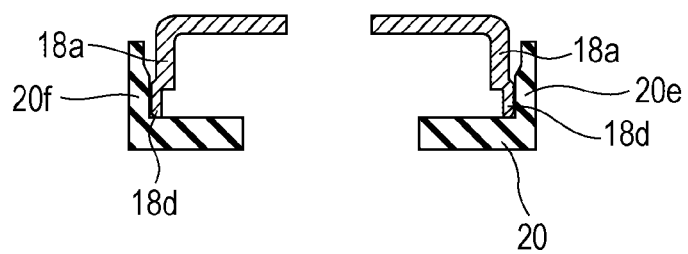

RECTANGULAR SECONDARY BATTERY AND METHOD OF MAKING THE SAME

CROSS REFERENCE TO RELATED APPLICATIONS

The present invention application claims priority to Japanese Patent Application No. 2014-161109 filed in the Japan Patent Office on Aug. 7, 2014, the entire contents of which are incorporated herein by reference.

BACKGROUND OF THE INVENTION

Field of the Invention

The present invention relates to a rectangular secondary battery including a circuit breaker and a method of making the same.

Description of Related Art

Development of secondary batteries for use as power sources of vehicles, such as electric vehicles (EV) and hybrid electric vehicles (HEV, PHEV), or the like is underway. Because high capacity and high power are required for vehicle power sources or the like, a plurality of secondary batteries that are connected in series or in parallel are used. In view of space efficiency, rectangular secondary batteries are used as such secondary batteries.

A very high level of safety is required for secondary batteries for such use. Therefore, as described in Japanese Published Unexamined Patent Applications No. 2008-066254 (Patent Document 1), Japanese Published Unexamined Patent Applications No. 2008-066255 (Patent Document 2), and Japanese Published Unexamined Patent Applications No. 2010-212034 (Patent Document 3), some secondary batteries include a gas discharge valve for reducing internal pressure when the pressure in a battery housing increases, and a circuit breaker for breaking an electrical connection between an electrode body and a terminal.

For rectangular secondary batteries including a circuit breaker, it is required that the circuit breaker be immediately activated to break an electrical connection between the electrode body and the terminal if the pressure inside the battery reaches a predetermined value.

BRIEF SUMMARY OF THE INVENTION

An object of the present invention is to provide a highly reliable rectangular secondary battery including a circuit breaker that is immediately activated when the pressure inside the battery reaches a predetermined value.

In developing rectangular secondary batteries including a circuit breaker, the inventors found that a problem occasionally occurs in that a conduction path between an electrode body and a terminal is not immediately cut even if the pressure inside the battery reaches a predetermined value. The inventors investigated and examined the cause of such a problem. As a result, the inventors found that the following difference exists between a case where the conduction path between the electrode body and the terminal is immediately cut and a case where the conduction path between the electrode body and the terminal is not immediately cut when the pressure inside the battery reaches a predetermined value.

As illustrated in FIGS. 16A to 16C, the circuit breaker includes an electroconductive member 41 having a cup-like shape, an inversion plate 42, a current collector 43, and an insulating member 44. The inversion plate 42 is welded to a lower end of a tubular portion 41a of the electroconductive member 41 in such a way that an opening at the lower end of the tubular portion 41a is tightly closed. The current collector 43 is welded to a central part of a lower surface of the inversion plate 42. The current collector 43 has a through-hole 43a, and the edge of the through-hole 43a is welded to the lower surface of the inversion plate 42. The current collector 43 has a thin portion 43b around the through-hole 43a. A notch portion 43c, which has an annular shape and which surrounds the through-hole 43a, is formed in the thin portion 43b. The insulating member 44, which has a through-hole 44a, is disposed between the inversion plate 42 and the current collector 43. The inversion plate 42 and the current collector 43 are connected to each other through the through-hole 44a. The insulating member 44 has a pair of projections 44b. Each of the projections 44b is fitted into a corresponding one of through-holes 43d, which are formed in the current collector 43, so that the insulating member 44 is connected to the current collector 43. A terminal 46 fixes the electroconductive member 41 to a sealing plate 45. A gasket 47 and an insulating member 48 insulate the terminal 46 and the electroconductive member 41 from the sealing plate 45.

In the case where the conduction path between the electrode body and the terminal is immediately cut when the pressure inside the battery reaches a predetermined value, the circuit breaker functions as follows (see FIGS. 16A to 16C).

(1) The pressure inside the battery reaches a predetermined value.
(2) The central part of the inversion plate 42 (which is connected to the current collector 43) deforms so as to be pushed up toward the sealing plate 45.
(3) Due to (2), a part of the current collector 43 welded to the inversion plate 42 is pulled toward the sealing plate 45.
(4) The notch portion 43c, which is disposed around the weld of the current collector 43, becomes partially cracked, and a part of the notch portion 43c becomes broken (see FIG. 16B).
(5) Substantially simultaneously with (4), the broken part extends and a region surrounding the weld becomes broken (see FIG. 16C).
(6) The electrical connection between the inversion plate 42 and the current collector 43 is cut.

In contrast, in the case where the conduction path between the electrode body and the terminal is not immediately cut when the pressure inside the battery reaches a predetermined value, the circuit breaker functions as follows (see FIGS. 17A to 17C).

(1) The pressure inside the battery reaches a predetermined value.
(2) The central part of the inversion plate 42 (which is connected to the current collector 43) deforms so as to be pushed up toward the sealing plate 45.
(3) Due to (2), a part of the current collector 43 welded to the inversion plate 42 is pulled toward the sealing plate 45.
(4) The notch portion 43c, which is disposed around the weld of the current collector 43, becomes partially cracked, and a part of the notch portion 43c becomes broken (see FIG. 17B).
(5) An uncut part remains around the weld (see FIG. 17B).
(6) Through the uncut part, the inversion plate 42 pulls the current collector 43 and the insulating member 44 fixed to the current collector 43 toward the center, and the current collector 43 and the insulating member 44 fixed to the current collector 43 move in a horizontal direction (see FIG. 17C).

(7) As the current collector 43 moves in the horizontal direction, the distance between the inversion plate 42 and a breakable portion (the notch portion 43c) of the current collector 43 changes. Moreover, the inclination of the current collector 43 with respect to the inversion plate 42 increases. Therefore, it becomes necessary that the inversion plate 42 move further toward the sealing plate 45 for the uncut portion to be cut.

(8) Thus, even if the pressure inside the battery reaches a predetermined value, the conduction path is not immediately cut.

Even in the case where the conduction path between the electrode body and the terminal is immediately cut, there is a time lag from the time at which the current collector 43 becomes cracked and a part of the breakable portion (the notch portion 43c) becomes broken to the time at which the entire breakable portion (the notch portion 43c) becomes broken. However, because the time lag is negligibly short, the conduction path is immediately cut when the pressure inside the battery reaches a predetermined value.

A rectangular secondary battery according to an aspect of the present invention includes a rectangular housing that has an opening; a sealing plate that has a through-hole and that seals the opening; an electrode body that includes a positive electrode plate and a negative electrode plate and that is disposed in the rectangular housing; a terminal that is electrically connected to the positive electrode plate or the negative electrode plate and that is inserted into the through-hole of the sealing plate; an electroconductive member that is disposed between the sealing plate and the electrode body, that is electrically connected to the terminal, and that has an opening portion at an end thereof on the electrode body side; an inversion plate that seals the opening portion; a current collector that is electrically connected to the positive electrode plate or the negative electrode plate and that is connected to the inversion plate; and a first insulating member that is disposed between the inversion plate and the current collector. When the pressure inside the rectangular housing reaches a predetermined value or higher, the inversion plate deforms and an electrical connection between the positive electrode plate or the negative electrode plate and the terminal is cut due to deformation of the inversion plate. The first insulating member has a through-hole. The inversion plate and the current collector are connected to each other through the through-hole of the first insulating member. The first insulating member and the current collector are fixed to each other. The electroconductive member has a first outer side surface and a second outer side surface that face away from each other. The first insulating member includes a first pressing portion that is located outside of the first outer side surface and that presses the first outer side surface toward the second outer side surface and a second pressing portion that is located outside of the second outer side surface and that presses the second outer side surface toward the first outer side surface.

In the rectangular secondary battery according to the aspect of the present invention, the first insulating member is securely fixed to the electroconductive member. Thus, as described in (6) to (8) of "the case where the conduction path between the electrode body and the terminal is not immediately cut", even if a force that pulls the first insulating member and current collector toward the center is applied, movement of the first insulating member and the current collector toward the center can be suppressed. Accordingly, the positional relationship between a breakable portion of the current collector and the inversion plate is not likely to be changed, and the inclination of the current collector with respect to the inversion plate is not likely to be changed. Therefore, the uncut portion can be easily cut. Thus, when the pressure inside the battery reaches a predetermined value, a conduction path between the electrode body and the terminal is immediately cut.

Preferably, the first insulating member includes a body that is disposed parallel to the sealing plate and a first side wall and a second side wall that protrude from the body toward the sealing plate, and the first side wall includes the first pressing portion and the second side wall includes the second pressing portion.

Preferably, the current collector has a through-hole, the first insulating member has a projection on a surface thereof on the current collector side, and the current collector and the first insulating member are fixed to each other by fitting the projection into the through-hole of the current collector. Preferably, the number of fitting portions at which the current collector and the first insulating member are fitted to each other is two or more.

Preferably, the current collector includes an annular notch portion that surrounds a region in which the current collector and the inversion plate are welded to each other. Preferably, the notch portion is formed in a thin-walled portion.

Preferably, the current collector has a through-hole, and a part of the current collector around the through-hole or an edge of the current collector is welded to the inversion plate.

Preferably, the electroconductive member has a pair of short outer side surfaces that each extend along a short side of the sealing plate and a pair of long outer side surfaces that each extend along a long side of the sealing plate, and the first outer side surface and the second outer side surface are the pair of short outer side surfaces. Preferably, the shape of the electroconductive member in plan view is a substantially rectangular shape. The term "substantially rectangular shape" refers to a shape having a pair of long sides and a pair of short sides. Examples of such a shape include a rectangle, a rectangle with rounded corners, and a rectangle with cut corners.

The aforementioned movement of the current collector and the first insulating member fixed to the current corrector in the horizontal direction is likely to occur in the direction along the long side of the sealing plate. Accordingly, to prevent such movement, preferably, a pair of short side outer surfaces extending along the short side of the sealing plate are the first outer side surface and the second outer side surface.

Preferably, the electroconductive member has a third outer side surface and a fourth outer side surface that face away from each other, and the first insulating member includes a third pressing portion that is located outside of the third outer side surface and that presses the third outer side surface toward the fourth outer side surface and a fourth pressing portion that is located outside of the fourth outer side surface and that presses the fourth outer side surface toward the third outer side surface.

A method of making a rectangular secondary battery according to an aspect of the present invention is a method of making a rectangular secondary battery including a rectangular housing that has an opening; a sealing plate that has a through-hole and that seals the opening; an electrode body that includes a positive electrode plate and a negative electrode plate and that is disposed in the rectangular housing; a terminal that is electrically connected to the positive electrode plate or the negative electrode plate and that is inserted into the through-hole of the sealing plate; an electroconductive member that is disposed between the sealing plate and the electrode body, that is electrically connected to the terminal, and that has an opening portion at an end thereof on the electrode body side; an inversion plate that seals the opening portion; a current collector that is electrically connected to the positive electrode plate or the negative electrode plate and that is connected to the inversion plate; and a first insulating member that is disposed between the inversion plate and the current collector. The first insulating member has a through-hole. The inversion plate and the current collector are connected to each other through the through-hole of the first insulating member. The first insulating member and the current collector are fixed to each other. The electroconductive member has a first outer side surface and a second outer side surface that face away from each other. The first insulating member includes a first pressing portion that is located outside of the first outer side surface and that presses the first outer side surface toward the second outer side surface and a second pressing portion that is located outside of the second outer side surface and that presses the second outer side surface toward the first outer side surface. When the pressure inside the rectangular housing reaches a predetermined value or higher, the inversion plate deforms and an electrical connection between the positive electrode plate or the negative electrode plate and the terminal is cut due to deformation of the inversion plate. The method includes a step of attaching the first insulating member to the electroconductive member. In a state before the first insulating member is attached to the electroconductive member, a distance between a part of the first insulating member to become the first pressing portion and a part of the first insulating member to become the second pressing portion is smaller than a distance between a part of the electroconductive member to be pressed by the first pressing portion and a part of the electroconductive member to be pressed by the second pressing portion.

BRIEF DESCRIPTION OF THE SEVERAL VIEWS OF THE DRAWINGS

FIG. 1A is a sectional view of a rectangular secondary battery according to an embodiment, and FIG. 1B is a sectional view taken along line IB-IB of FIG. 1A;

FIG. 12 is a sectional view taken along line IX-IX of FIG. 6, illustrating a step of attaching the first insulating member to the electroconductive member;

DETAILED DESCRIPTION OF THE INVENTION

Figure 2:
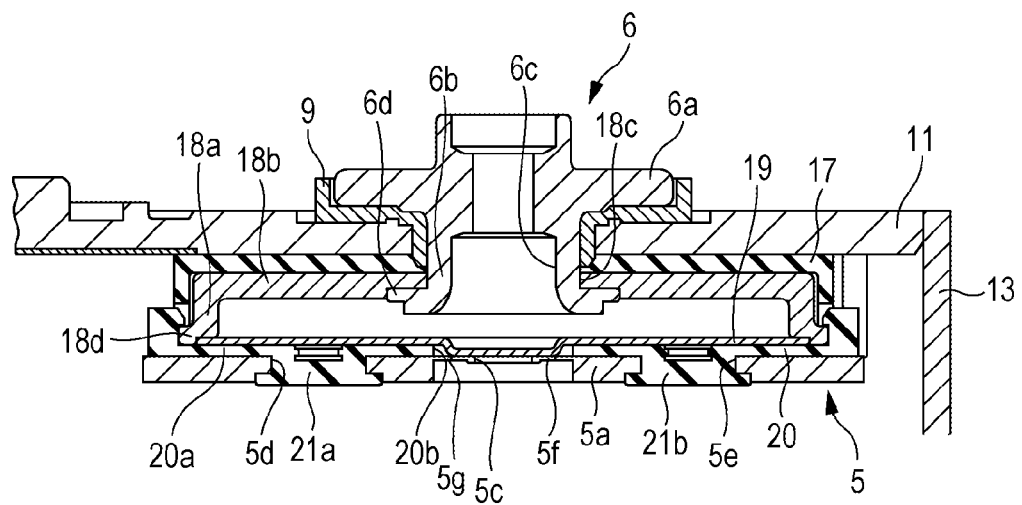
FIG. 2 is a sectional view of a circuit breaker disposed on the positive electrode side of the rectangular secondary battery shown in FIGS. 1A and 1B, taken along the long side of a sealing plate.

Hereinafter, a rectangular secondary battery according to an embodiment of the present invention will be described with reference to the drawings. Note that the present invention is not limited to this rectangular secondary battery.

Embodiment

First, referring to FIG. 1, a rectangular secondary battery 1 according to the embodiment will be described. The rectangular secondary battery 1 according to the embodiment includes a planar rolled electrode body 2, in which a positive electrode plate and a negative electrode plate (each of which is not shown) are rolled up with a separator (not shown) therebetween. The positive electrode plate is made by applying a positive electrode active material mixture to a positive electrode core made from an aluminum foil, drying and rolling the positive electrode core formed with a positive electrode active material mixture layer, and slitting the positive electrode core formed with the positive electrode active material mixture layer in such a way that a part of the aluminum foil is exposed at one end of the positive electrode core in a strip-like shape extending in the longitudinal direction. The negative electrode plate is made by applying a negative electrode active material mixture to a negative electrode core made from a copper foil, drying and rolling the negative electrode core formed with a negative electrode active material mixture layer, and slitting the negative electrode core formed with the negative electrode active material mixture layer so that a part of the copper foil is exposed at one end of the negative electrode core in a strip-like shape extending in the longitudinal direction.

The planar rolled electrode body 2 is made by rolling up the positive electrode plate and the negative electrode plate, which have been obtained as described above, with a polyethylene porous separator therebetween in such a way that the positive electrode plate and the negative electrode plate are displaced from each other so that a positive electrode core exposed portion of the positive electrode plate and a negative electrode core exposed portion of the negative electrode plate have regions that do not overlap opposing electrodes. A positive electrode core exposed portion 3, which is rolled, is formed at one end of the planar rolled electrode body 2 in the direction of the rolling axis. A negative electrode core exposed portion 4, which is rolled, is formed at the other end of the planar rolled electrode body 2 in the direction of the rolling axis.

The positive electrode core exposed portion 3, which is rolled, is electrically connected to a positive electrode terminal 6 through a positive electrode collector 5. The negative electrode core exposed portion 4, which is rolled, is electrically connected to a negative electrode terminal 8 through a negative electrode collector 7. The positive electrode terminal 6 and the negative electrode terminal 8 are respectively fixed to a sealing plate 11 with a gasket 9 and a gasket 10, which have insulating properties, therebetween. The rectangular secondary battery 1 includes a circuit breaker 30 of a pressure-sensitive type between the positive electrode plate and the positive electrode terminal 6 or between the negative electrode plate and the negative electrode terminal 8.

The planar rolled electrode body 2 is disposed in a rectangular housing 13 in a state in which the periphery of the planar rolled electrode body 2 excluding a part of the periphery on the sealing plate 11 side is covered by a resin sheet 12. The sealing plate 11 seals an opening of the housing 13. The sealing plate 11 has a liquid electrolyte injection hole 14. After a liquid electrolyte has been injected, the liquid electrolyte injection hole 14 is sealed by using a sealing plug 15. A gas discharge valve 16, which opens when a gas pressure higher than the working pressure of the circuit breaker is applied, is disposed in the sealing plate 11.

Next, the circuit breaker will be described. The circuit breaker may be disposed at either of a position on the positive electrode side and a position on the negative electrode side. In the following description, it is assumed that the circuit breaker is disposed only at a position on the positive electrode side.

Figure 3:
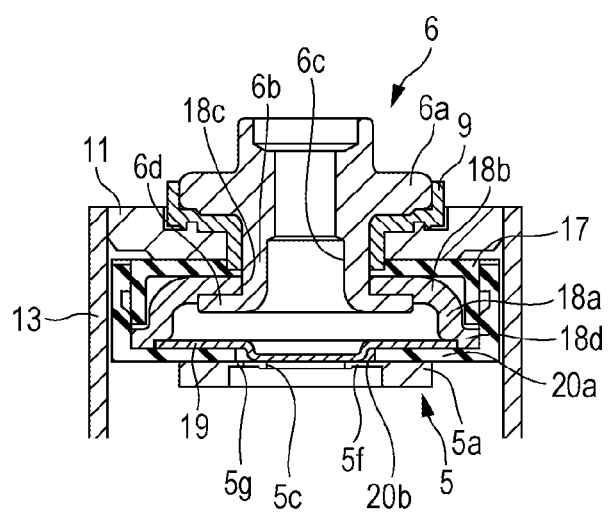
FIG. 3 is a sectional view of the circuit breaker disposed on the positive electrode side of the rectangular secondary battery shown in FIGS. 1A and 1B, taken along the short side of the sealing plate.

As illustrated in FIGS. 2 and 3, the positive electrode terminal 6 includes a flange portion 6a and a tubular portion 6b disposed on one side of the flange portion 6a. A through-hole 6c is formed in the positive electrode terminal 6. The tubular portion 6b is inserted into through-holes formed in the gasket 9, the sealing plate 11, a second insulating member 17, and an electroconductive member 18. A distal end portion 6d of the tubular portion 6b is upset so that the gasket 9, the sealing plate 11, the second insulating member 17, and the electroconductive member 18 are integrally fixed to each other. Thus, the positive electrode terminal 6 is electrically connected to the electroconductive member 18 in a state in which the positive electrode terminal 6 is electrically insulated from the sealing plate 11 by the gasket 9 and the second insulating member 17. Preferably, a connection portion between the distal end portion 6d and the electroconductive member 18 is welded by laser welding or the like. Preferably, the through-hole 6c of the positive electrode terminal 6 is sealed by using, for example, a terminal plug (not shown) that is made of rubber and has a metal plate at an upper end thereof.

Figure 4:
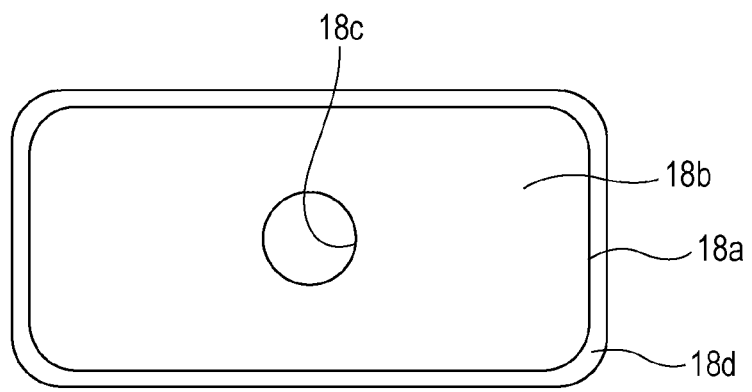
FIG. 4 is a top view of an electroconductive member of the rectangular secondary battery according to the embodiment.

The second insulating member 17 is disposed between the sealing plate 11 and the electroconductive member 18 and insulates the sealing plate 11 and the electroconductive member 18 from each other. As illustrated in FIG. 4, the electroconductive member 18 is made of aluminum and has a cup-like shape that is substantially rectangular in plan view. The electroconductive member 18 includes a tubular portion 18a, which has a substantially rectangular sectional shape, on the rolled electrode body 2 side; and a connection portion 18b, which is disposed parallel to the sealing plate 11, on the sealing plate 11 side. The electroconductive member 18 has a through-hole 18c, into which the tubular portion 6b of the positive electrode terminal 6 is inserted.

A peripheral portion of an inversion plate 19 is welded to an end of the tubular portion 18a of the electroconductive member 18 on the rolled electrode body 2 side. Thus, an opening of the tubular portion 18a of the electroconductive member 18 on the rolled electrode body 2 side is hermetically sealed. Preferably, the electroconductive member 18 includes a flange portion 18d at an end of the tubular portion 18a on the rolled electrode body 2 side. The inversion plate 19 is made of an electroconductive material, such as aluminum, and functions as a valve that deforms toward the sealing plate 11 (toward the outside of the battery) when the pressure inside the housing 13 increases. The positive electrode collector 5 is connected to a surface of the inversion plate 19 on the rolled electrode body 2 side. When the pressure inside the housing 13 increases, a central part of the inversion plate 19 (to which the positive electrode collector 5 is connected) deforms so as to move toward the sealing plate 11.

Figure 5:
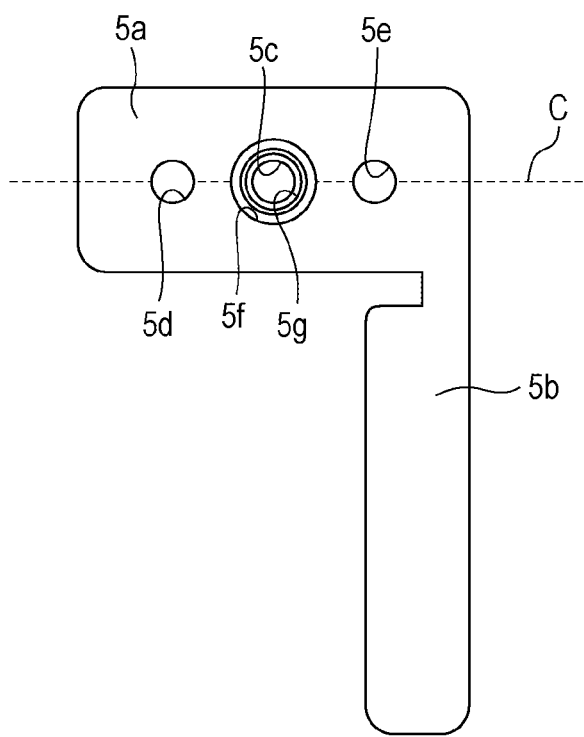
FIG. 5 is a bottom view of a positive electrode collector of the rectangular secondary battery according to the embodiment before the positive electrode collector is bent.

FIG. 5 illustrates the shape of a surface of the positive electrode collector 5 on the rolled electrode body 2 side before the positive electrode collector 5 is bent. The positive electrode collector 5 includes a first region 5a, which is disposed parallel to the sealing plate 11, and a second region 5b, which is bent from the first region 5a and connected to the positive electrode core exposed portion 3. The positive electrode collector 5 is made by punching an aluminum plate. The positive electrode collector 5 has through-holes 5c, 5d, and 5e. The through-hole 5c is formed in a central part of the first region 5a. The through-holes 5d and 5e are formed on both sides of the through-hole 5c on a central line C that passes through the center of the through-hole 5c and that extends along the long side of the sealing plate 11. A thin-walled region 5f, which has a thickness smaller than other parts, is formed in a part of the first region 5a around the through-hole 5c. An annular notch portion 5g, which surrounds the through-hole 5c, is formed in the thin-walled region 5f. The notch portion 5g is formed in a groove-like shape so that the thickness thereof is smaller than that of the thin-walled region 5f. Preferably, the cross-sectional shape of the notch portion 5g is V-shaped. There is no limitation on the thickness of the thinnest part of the notch portion 5g. For example, the thinnest part may have a thickness in the range of about 0.01 to 0.2 mm, and more preferably, in the range of about 0.02 to 0.1 mm.

The first region 5a of the positive electrode collector 5 is brought into contact with a central part of a surface of the inversion plate 19 on the rolled electrode body 2 side, and a periphery of the through-hole 5c of the first region 5a is laser welded to the inversion plate 19 at several positions. Thus, the inversion plate 19 and the positive electrode collector 5 are connected to each other.

A first insulating member 20, which has a through-hole 20b and is made of a resin material, is disposed between the inversion plate 19 and the first region 5a of the positive electrode collector 5. The first region 5a of the positive electrode collector 5 and the inversion plate 19 are connected to each other at a position corresponding to the through-hole 20b. The positive electrode collector 5 and the inversion plate 19 may be connected to each other in the through-hole 20b. Alternatively, a part of the inversion plate 19 may extend through the through-hole 20b, and the inversion plate 19 and the positive electrode collector 5 may be connected to each other at a position between the first insulating member 20 and the rolled electrode body 2. Further alternatively, a part of the positive electrode collector 5 may extend through the through-hole 20b, and the inversion plate 19 and the positive electrode collector 5 may be connected to each other at a position between the first insulating member 20 and the sealing plate 11.

On both sides of the through-hole 20b of the first insulating member 20, projections 21a and 21b are formed at positions corresponding to the through-holes 5d and 5e in the first region 5a of the positive electrode collector 5.

The first insulating member 20 is fixed to the first region 5a of the positive electrode collector 5 by inserting the projections 21a and 21b of the first insulating member 20 respectively into the through-holes 5d and 5e in the first region 5a of the positive electrode collector 5 and by heating end portions of the projections 21a and 21b to increase the diameters of the end portions.

Preferably, the second insulating member 17 and the first insulating member 20 are connected by engaging them with each other. The method of fixing these members is not particularly limited. Here, the second insulating member 17 and the first insulating member 20 are connected by latching them onto each other.

With the structure described above, the positive electrode core exposed portion 3 is electrically connected to the positive electrode terminal 6 through the second region 5b of the positive electrode collector 5, the first region 5a of the positive electrode collector 5, the inversion plate 19, and the electroconductive member 18. The tubular portion 18a of the electroconductive member 18, the inversion plate 19, the first insulating member 20, and the first region 5a of the positive electrode collector 5 constitute the circuit breaker 30 according to the present embodiment. When the pressure inside the housing 13 increases, the inversion plate 19 deforms so as to bulge toward the through-hole 6c of the positive electrode terminal 6. The first region 5a of the positive electrode collector 5 is welded to the central portion of the inversion plate 19. Therefore, when the pressure inside the housing 13 exceeds a predetermined value, the first region 5a of the positive electrode collector 5 becomes broken at the notch portion 5g, and thereby an electrical connection between the inversion plate 19 and the first region 5a of the positive electrode collector 5 is cut.

Next, the first insulating member 20 of the rectangular secondary battery 1 according to the embodiment will be described in detail.

Figure 6:
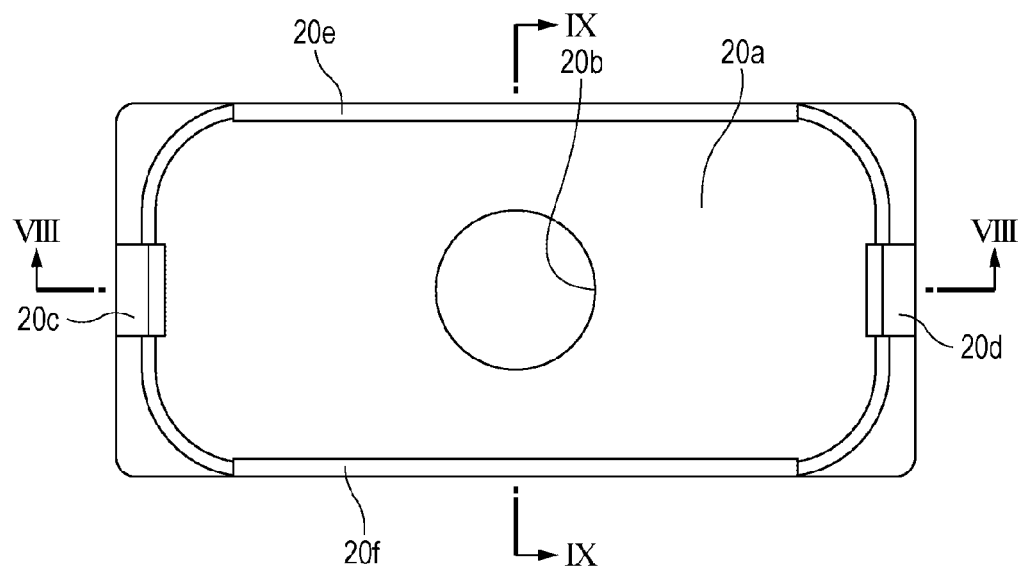
FIG. 6 is a top view of a first insulating member of the rectangular secondary battery according to the embodiment.
Figure 7:
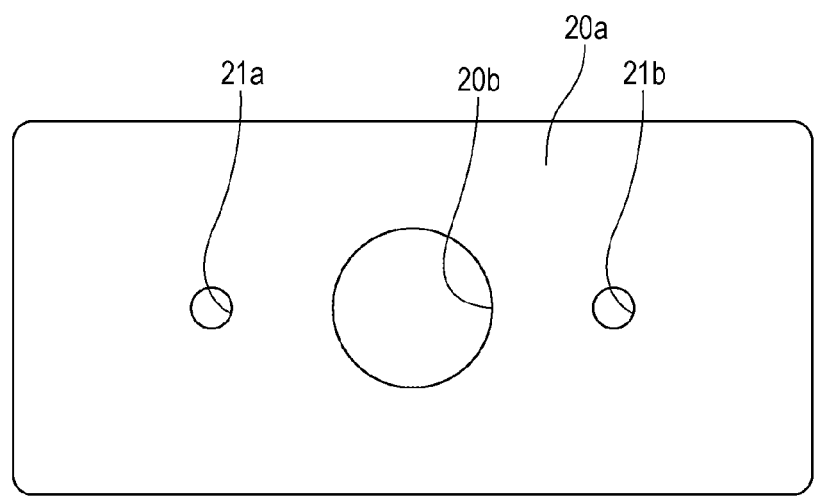
FIG. 7 is a bottom view of the first insulating member of the rectangular secondary battery according to the embodiment.
Figure 8:
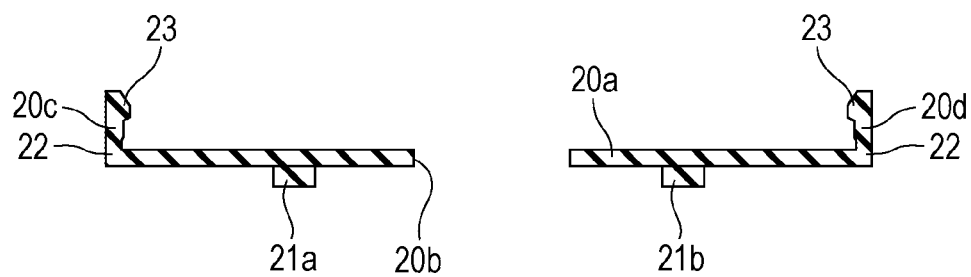
FIG. 8 is a sectional view taken along line VIII-VIII of FIG. 6.
Figure 9:
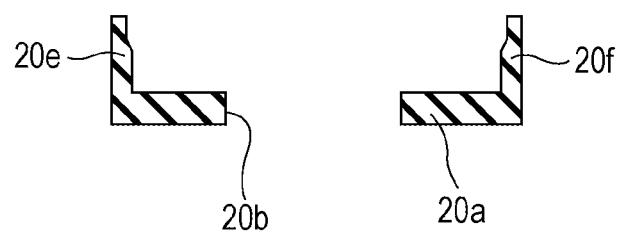
FIG. 9 is a sectional view taken along line IX-IX of FIG. 6.

FIG. 6 is a top view of the first insulating member 20, and FIG. 7 is a bottom view of the first insulating member 20. The first insulating member 20 has the through-hole 20b in a central part of a body 20a. The inversion plate 19 and the positive electrode collector 5 are connected to each other at a position corresponding to the through-hole 20b. On a lower surface of the first insulating member 20, the projection 21a and the projection 21b are respectively formed on both sides of the through-hole 20b. The projections 21a and 21b are respectively inserted into the through-holes 5d and 5e of the first region 5a of the positive electrode collector 5 and the diameters of the end portions of the projections 21a and 21b are increased, and thereby the first insulating member 20 is fixed to the first region 5a of the positive electrode collector 5.

The first insulating member 20 has a substantially rectangular shape in plan view (such as a rectangle, a rectangle with rounded corners, or a rectangle with cut corners). A pair of short side walls 20c and 20d, which face each other, are formed on the periphery of an upper surface of the first insulating member 20 so as to extend along the short side of the first insulating member 20. The short side walls 20c and 20d are each formed so as to extend along the short side of the sealing plate 11 (in a direction in which the short side of the sealing plate 11 extends). In the rectangular secondary battery 1 according to the embodiment, the short side walls 20c and 20d correspond to a first side wall and a second side wall. The short side walls 20c and 20d each include a first region 22, which extends upward from the body 20a of the first insulating member 20 (toward the sealing plate 11), and a protruding portion 23, which protrudes from the first region 22 toward the electroconductive member 18. The short side walls 20c and 20d are respectively fixed to the electroconductive member 18 in such a way that the protruding portions 23 are engaged with the flange portion 18d at an end of the tubular portion 18a of the electroconductive member 18 on the rolled electrode body 2 side.

Figure 10:
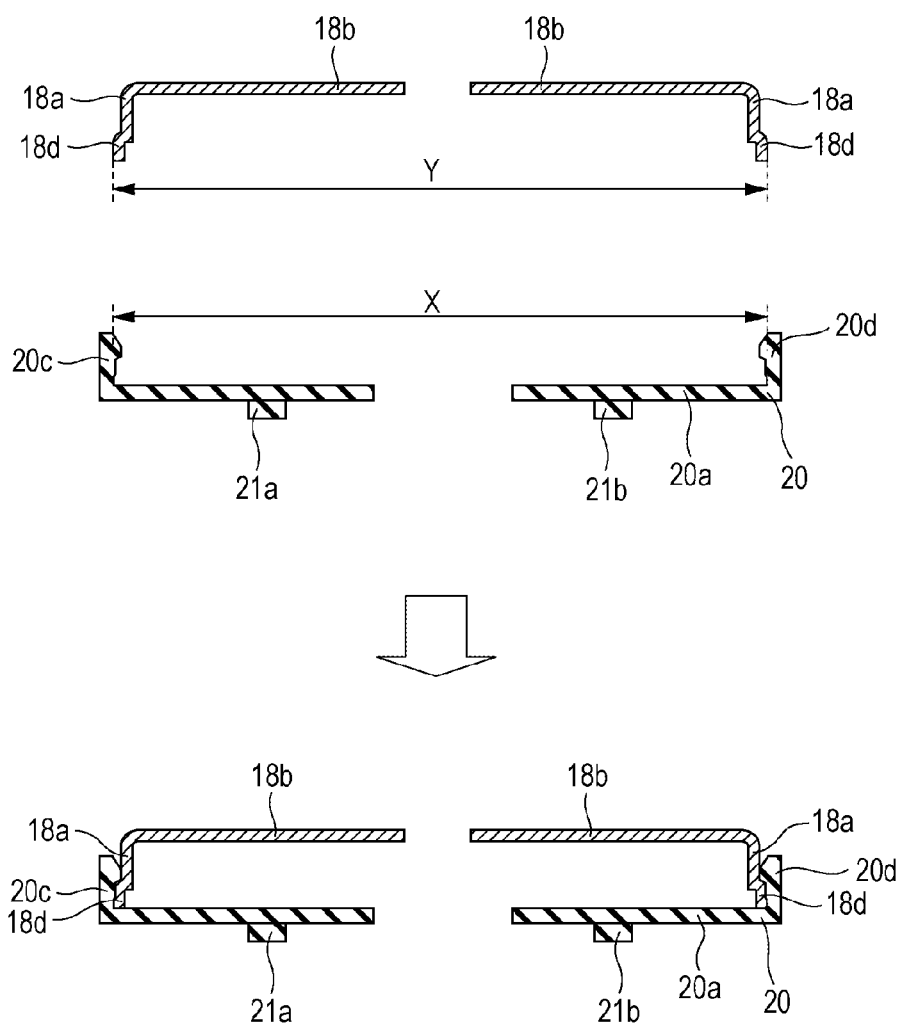
FIG. 10 is a sectional view taken along line VIII-VIII of FIG. 6, illustrating a step of attaching the first insulating member to the electroconductive member.

In a free state before the first insulating member 20 is attached to the electroconductive member 18, let X denote the distance between a part of the short side wall 20c to come into contact with the electroconductive member 18 and a part of the short side wall 20d to come into contact with the electroconductive member 18. In a state before the first insulating member 20 is attached to the electroconductive member 18, let Y be the distance between a part of the electroconductive member 18 to come into contact with the short side wall 20d and a part of the electroconductive member 18 to come into contact with the short side wall 20c. The rectangular secondary battery 1 according to the embodiment is made by using the first insulating member 20 and the electroconductive member 18 that satisfy distance X<distance Y (see FIG. 10). The value of distance X/distance Y is 1.000 or smaller. Preferably, the value of distance X/distance Y is smaller than 1.000. More preferably, the value of distance X/distance Y is 0.950 or larger and 1.000 or smaller, and more preferably, 0.950 or larger and smaller than 1.000. Further preferably, the value of distance X/distance Y is 0.990 or larger and 0.999 or smaller.

Figure 11:
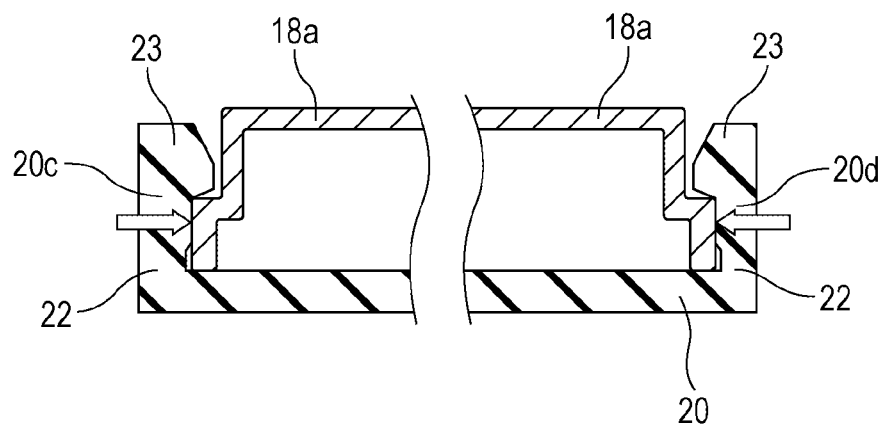
FIG. 11 is a sectional view taken along line VIII-VIII of FIG. 6, illustrating a state in which the first insulating member has been attached to the electroconductive member.

Thus, as illustrated in FIG. 11, when the first insulating member 20 is attached to the electroconductive member 18, the tubular portion 18a of the electroconductive member 18 is pressed by the short side walls 20c and 20d of the first insulating member 20 from both sides toward the center (toward the through-hole 20b). The short side wall 20c of the first insulating member 20 presses the outer surface of the tubular portion 18a of the electroconductive member 18 toward the short side wall 20d of the first insulating member 20. The short side wall 20d of the first insulating member 20 presses the outer surface of the tubular portion 18a of the electroconductive member 18 toward the short side wall 20c of the first insulating member 20. Thus, the first insulating member 20 can be reliably prevented from being moved relative to the electroconductive member 18 in a horizontal direction (a direction along the long side of the sealing plate 11). The inversion plate 19 is securely fixed to the electroconductive member 18 by welding. Moreover, the positive electrode collector 5 is securely fixed to the first insulating member 20. In the rectangular secondary battery 1, the short side walls 20c and 20d respectively include a first pressing portion and a second pressing portion. A part of the tubular portion 18a of the electroconductive member 18 pressed by the short side wall 20c corresponds to a first outer side surface. A part of the tubular portion 18a of the electroconductive member 18 pressed by the short side wall 20d corresponds to a second outer side surface. Accordingly, when the first insulating member 20 can be prevented from being moved relative to the electroconductive member 18 in a horizontal direction, the positive electrode collector 5 can also be prevented from being moved relative to the inversion plate 19 in the horizontal direction reliably.

Thus, the rectangular secondary battery 1 according to the embodiment can resolve the aforementioned problem. In other words, when the pressure inside the housing 13 reaches a predetermined value or higher, the inversion plate 19 deforms toward the sealing plate 11, and the notch portion 5g of the positive electrode collector 5 becomes partially broken, the positive electrode collector 5 is pulled by the inversion plate 19 and displacement in the horizontal direction does not occur. Accordingly, an uncut part of the notch portion 5g of the positive electrode collector 5 becomes immediately broken, and therefore the conduction path between the positive electrode plate and the positive electrode terminal 6 can be immediately cut.

A pair of long side walls 20e and 20f, which extend along the long side of the first insulating member 20, are formed on the periphery of the upper surface of the first insulating member 20. The pair of long side walls 20e and 20f extend upward from the body 20a of the first insulating member 20 (toward the sealing plate 11). Preferably, the tubular portion 18a of the electroconductive member 18 is pressed by the pair of long side walls 20e and 20f toward the center (toward the through-hole 20b). In a free state before the first insulating member 20 is attached to the electroconductive member 18, let X' denote the distance between a part of the long side wall 20e to come into contact with the electroconductive member 18 and a part of the long side wall 20f to come into contact with the electroconductive member 18. In a state before the first insulating member 20 is attached to the electroconductive member 18, let Y' be the distance between a part of the electroconductive member 18 to come into contact with the long side wall 20e and a part of the electroconductive member 18 to come into contact with the long side wall 20f. In this case, preferably, the first insulating member 20 and the electroconductive member 18 that satisfy distance X'<distance Y' is used (see FIG. 12).

With such a structure, when the first insulating member 20 is attached to the electroconductive member 18, the tubular portion 18a of the electroconductive member 18 is pressed by the long side walls 20e and 20f of the first insulating member 20 from both sides toward the center (toward the through-hole 20b). Thus, the first insulating member 20 can be reliably prevented from being moved relative to the electroconductive member 18 in a horizontal direction (a direction along the long side of the sealing plate 11). The value of distance X'/distance Y' is 1.000 or smaller. Preferably, the value of distance X'/distance Y' is smaller than 1.000. More preferably, the value of distance X'/distance Y' is 0.950 or larger and 1.000 or smaller, and more preferably, 0.950 or larger and smaller than 1.000. Further preferably, the value of distance X'/distance Y' is 0.990 or larger and 0.999 or smaller.

In the rectangular secondary battery 1 according to the embodiment, the shape of the first insulating member 20 is substantially rectangular in plan view, and the cross-sectional shape of the tubular portion of the electroconductive member 18 is substantially rectangular. However, this is not a limitation. For example, the cross-sectional shape of the tubular portion of the electroconductive member 18 may be circular. However, when the shape of the electroconductive member 18 in plan view is substantially rectangular, the aforementioned problem tends to occur. Therefore, the present invention is particularly effective when the shape of the electroconductive member 18 in plan view is substantially rectangular.

Figure 13:
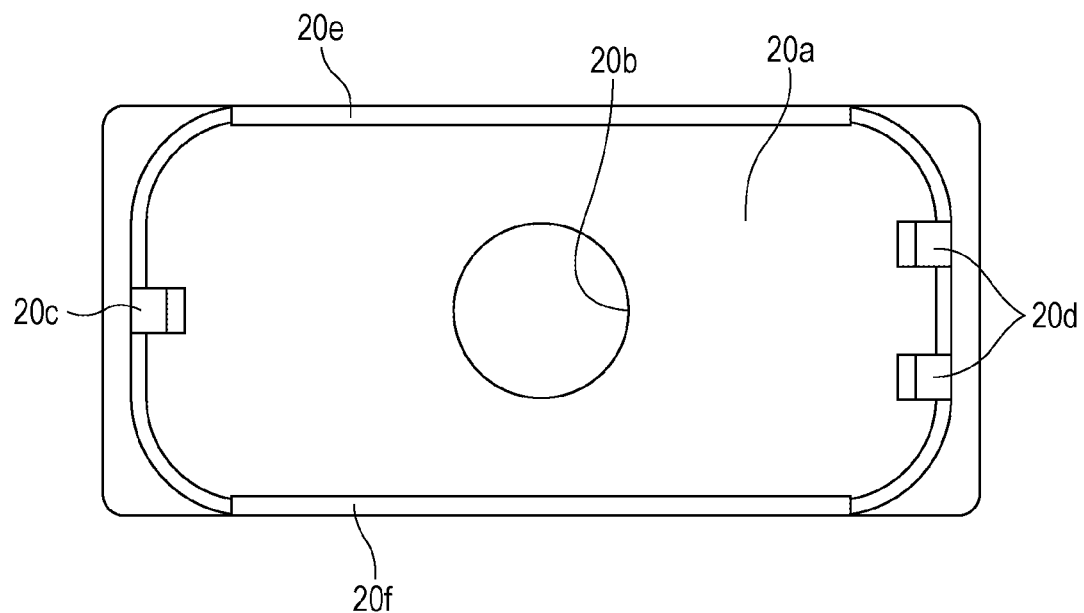
FIG. 13 is a top view of a first insulating member according to a modification.
Figure 14:
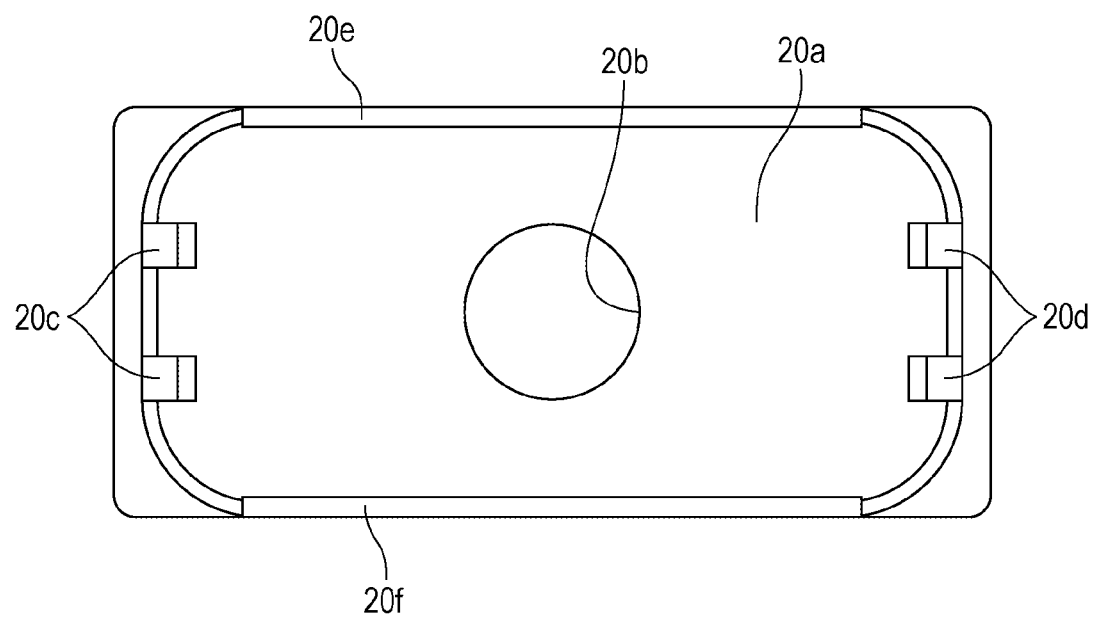
FIG. 14 is a top view of a first insulating member according to a modification.

As illustrated in FIG. 13, as a modification of the first insulating member, a short side wall 20c (pressing portion) may be disposed near one of short sides of the first insulating member 20 and a plurality of short side walls 20d (pressing portions) may be disposed near the other short side of the first insulating member 20. As illustrated in FIG. 14, a plurality of short side walls 20c (pressing portions) may be disposed near one of short sides of the first insulating member 20 and a plurality of short side walls 20d (pressing portions) may be disposed near the other short side of the first insulating member 20.

Figure 15:
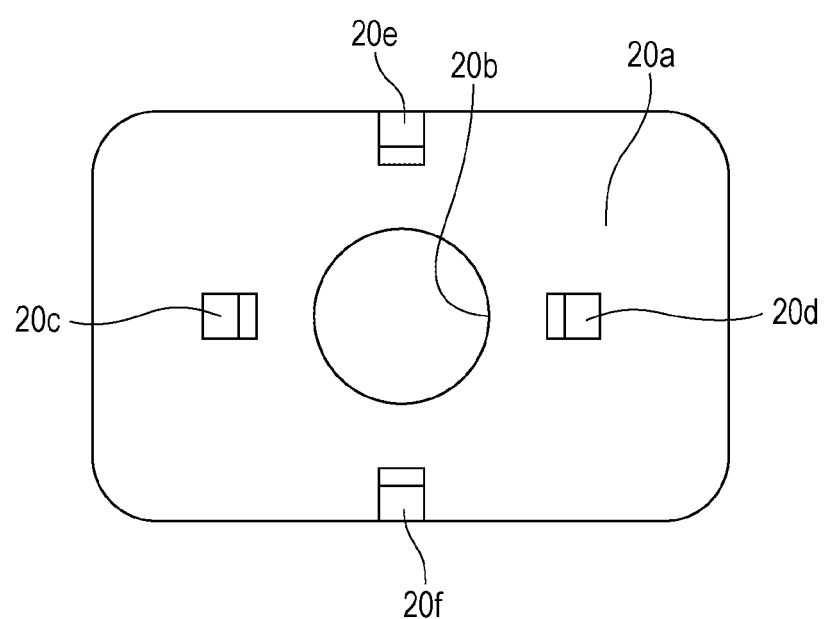
FIG. 15 is a top view of a first insulating member according to a modification.
Figure 16A:
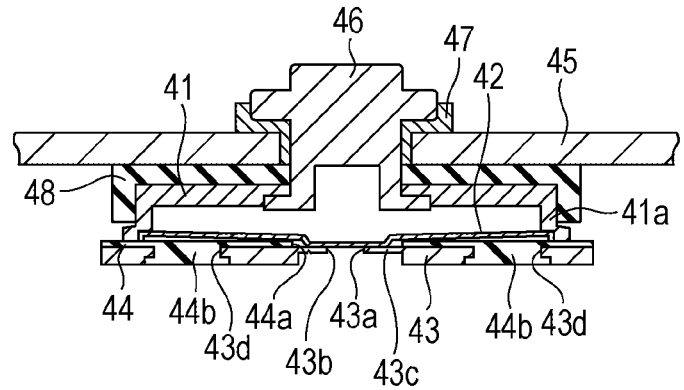
FIGS. 16A to 16C illustrate a way in which a circuit breaker functions.
Figure 16B:
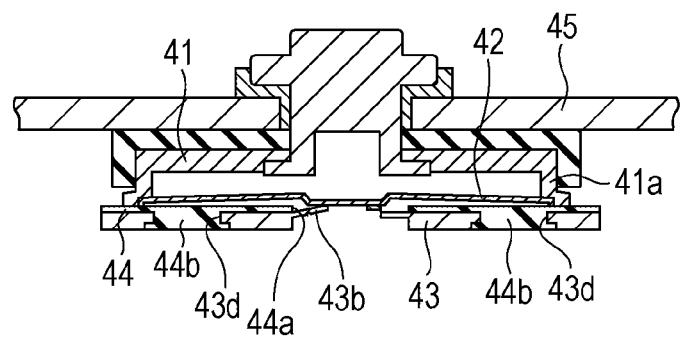
Figure 16C:
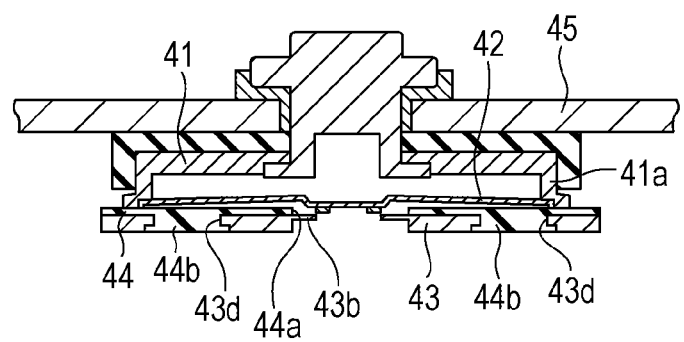
Figure 17A:
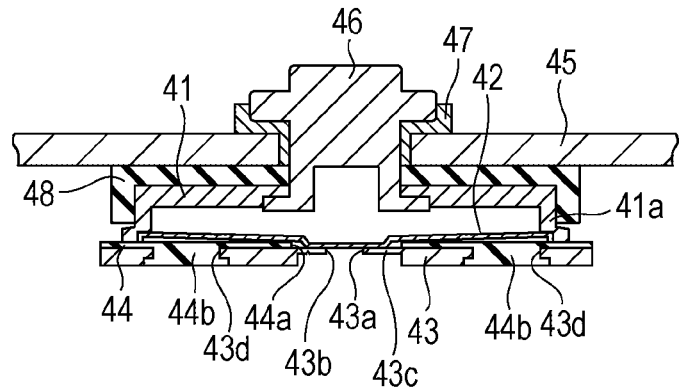
FIGS. 17A to 17C illustrate a way in which the circuit breaker functions.
Figure 17B:
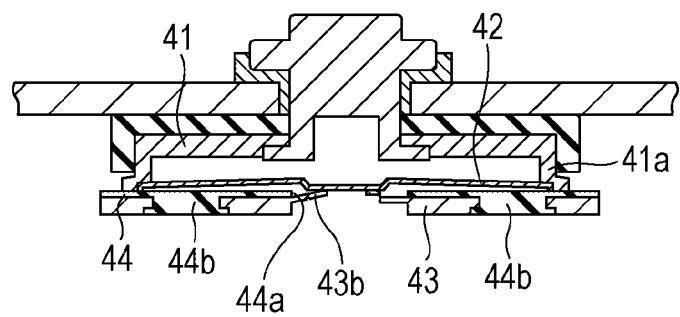
Figure 17C:
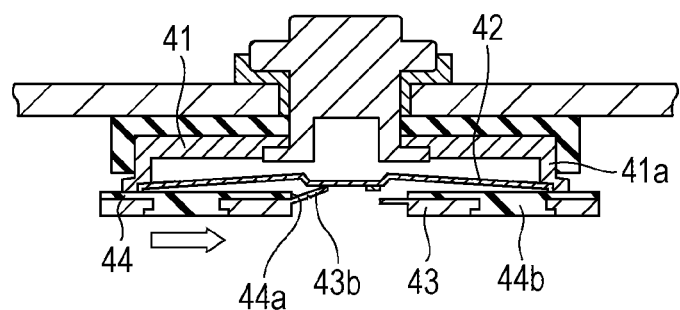

It is not necessary that the first pressing portion and the second pressing portion be disposed on the periphery of the body 20a of the first insulating member 20. As illustrated in FIG. 15, the first pressing portion and the second pressing portion may be disposed at positions separated from the periphery of the body 20a.

In the rectangular secondary battery 1 according to the embodiment, the electroconductive member 18 includes the flange portion 18d. However, the flange portion 18d may be omitted. Even in the case where the electroconductive member 18 includes the flange portion 18d, it is not necessary that the first pressing portion and the second pressing portion of the first insulating member each press the outer surface of the flange portion 18d of the electroconductive member 18. The first pressing portion and the second pressing portion of the first insulating member 20 may each press a part of the outer surface of the tubular portion 18a of the electroconductive member 18 between the flange portion 18d and the sealing plate 11. In the embodiment described above, each of the short side walls 20c and 20d of the first insulating member 20 includes the protruding portion 23. However, the protruding portion 23 may be omitted.

Preferably, the rectangular secondary battery is a non-aqueous electrolyte secondary battery, and more preferably, a lithium-ion secondary battery.

A rectangular secondary battery according to another embodiment for solving the aforementioned problem has the following structure. The rectangular secondary battery includes a rectangular housing that has an opening; a sealing plate that has a through-hole and that seals the opening; an electrode body that includes a positive electrode plate and a negative electrode plate and that is disposed in the rectangular housing; a terminal that is electrically connected to the positive electrode plate or the negative electrode plate and that extends through the through-hole of the sealing plate; an electroconductive member that is disposed between the sealing plate and the electrode body, that is electrically connected to the terminal, and that has an opening portion at an end thereof on the electrode body side; an inversion plate that seals the opening portion; a current collector that is electrically connected to the positive electrode plate or the negative electrode plate and that is connected to the inversion plate; and a first insulating member that is disposed between the inversion plate and the current collector. When the pressure inside the rectangular housing reaches a predetermined value or higher, the inversion plate deforms and an electrical connection between the positive electrode plate or the negative electrode plate and the terminal is cut due to deformation of the inversion plate. The first insulating member has a through-hole. The inversion plate and the current collector are connected to each other through the through-hole of the first insulating member. The first insulating member includes a recessed portion or a protruding portion on an upper surface thereof, and the second insulating member includes a fitting portion, to which the recessed portion or the protruding portion is fitted, on a lower surface thereof. The recessed portion or the protruding portion of the first insulating member is fitted to the fitting portion of the second insulating member, and the first insulating member and the second insulating member are fixed to each other.

In the rectangular secondary battery according to the other embodiment, in a case where the first insulating member includes a recessed portion in the upper surface thereof, the second insulation member includes a protruding portion, which is fitted into the recessed portion of the first insulating member, the lower surface thereof. The protruding portion of the second insulating member is fitted into the recessed portion of the first insulating member, so that the recessed portion and the protruding portion are fitted to each other. In a case where the first insulating member includes a protruding portion on the upper surface thereof, the second insulation member includes a recessed portion, into which the protrusion portion of the first insulating member is fitted, in the lower surface thereof. The protruding portion of the first insulating member is fitted into the recessed portion of the second insulating member, so that the protruding portion and the recessed portion are fitted to each other.

With such a structure, the second insulating member can be reliably prevented from being displaced relative to the first insulating member in a horizontal direction. Accordingly, the aforementioned problem can be reliably prevented. Alternatively, the first insulating member may include a pair of side walls extending upward from the body, the second insulating member may include a pair of side walls extending from the body toward the electrode body, and the inner surfaces of the side walls of the first insulating member may be connected to the outer surfaces of the side walls of the second insulating member. However, displacement in the horizontal direction can be more reliably prevented with the aforementioned structure than with the structure in which the inner surfaces of the side walls of the first insulating member are connected to the outer surfaces of the side walls of the second insulating member.

Figure 18:
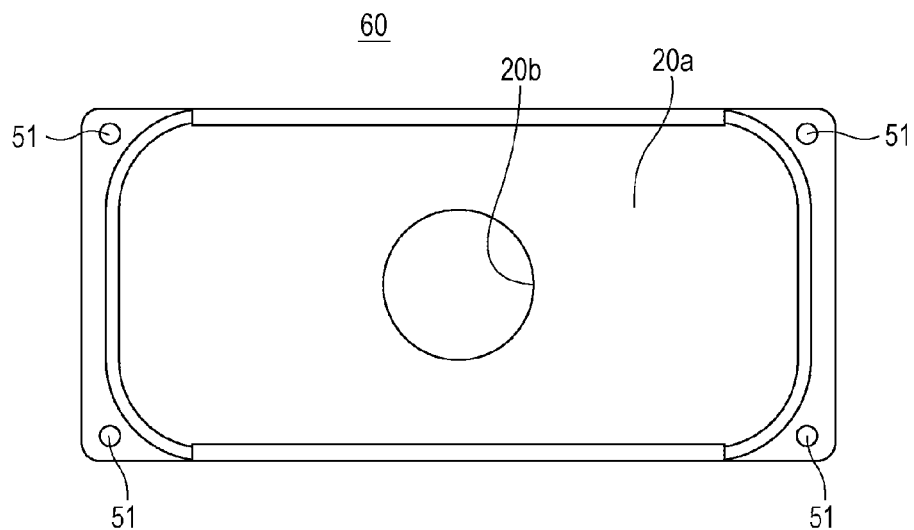
FIG. 18 is a top view of a first insulating member according to another embodiment.
Figure 19:
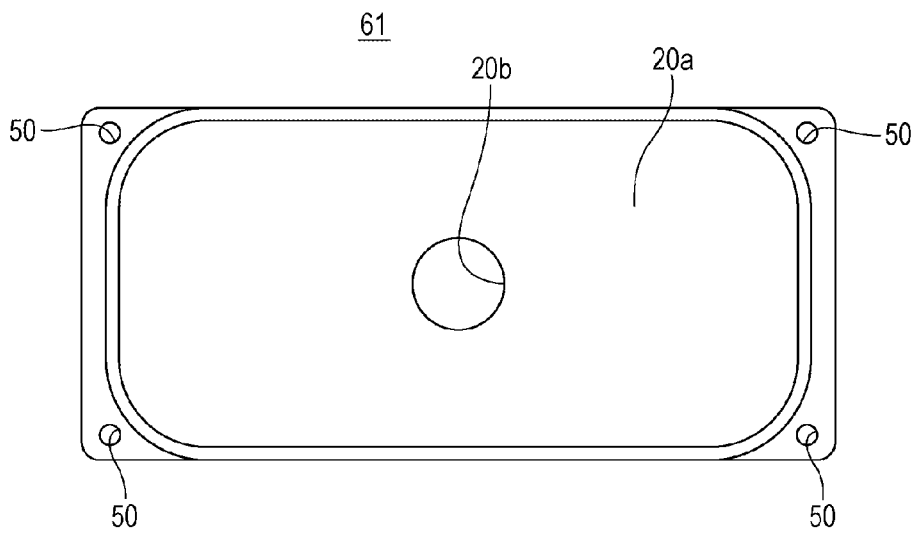
FIG. 19 is a bottom view of a second insulating member according to the other embodiment.

FIG. 18 is a top view of a first insulating member 60 of the rectangular secondary battery according to the other embodiment. FIG. 19 is a bottom view of a second insulating member 61 of the rectangular secondary battery according to the other embodiment. Protruding portions 51 are formed at four corners of an upper surface of the first insulating member 60. Recessed portions 50 are formed at four corners of a lower surface of the second insulating member 61.

Figure 20:
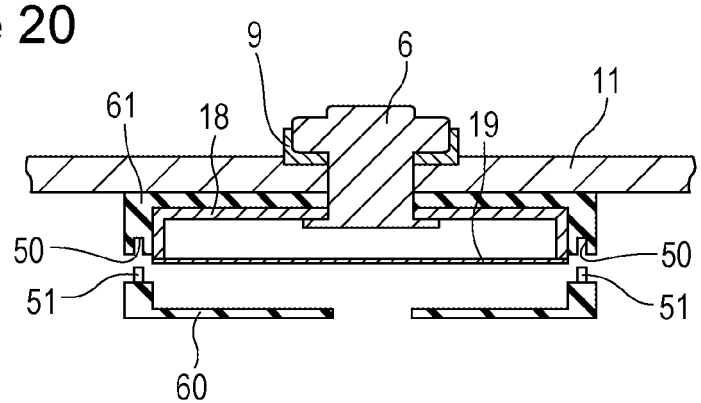
FIG. 20 is a sectional view of a circuit breaker according to the other embodiment.

As illustrated in FIG. 20, the protruding portions 51 on the upper surface of the first insulating member 60 are inserted and fitted into the recessed portions 50 in the lower surface of the second insulating member 61. Thus, the first insulating member 60 and the second insulating member 61 are fixed to each other. The first insulating member 60 and the second insulating member 61 may be fixed to each other at least at one position. Preferably, the first insulating member 60 and the second insulating member 61 are fitted and fixed to each other at three positions, and more preferably, at four positions.

Figure 21:
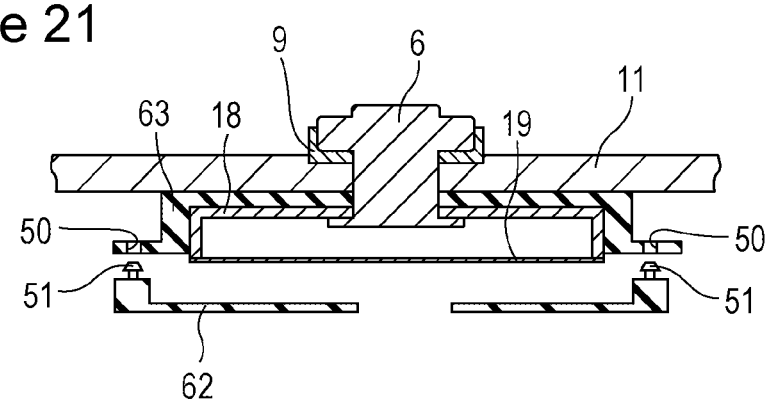
FIG. 21 is a sectional view of a circuit breaker according to the other embodiment.

As illustrated in FIG. 21, recessed portions 40 in the lower surface of a second insulating member 63 may be through-holes, and protruding portions 51 on the upper surface of a first insulating member 62 may include enlarged-diameter portions.

Figure 22:
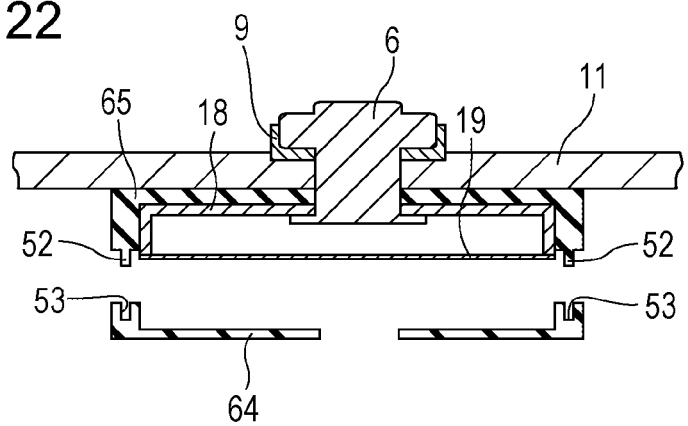
FIG. 22 is a sectional view of a circuit breaker according to the other embodiment.

As illustrated in FIG. 22, recessed portions 53 may be formed in the upper surface of a first insulating member 64, and protruding portions 52 may be formed on the lower surface of a second insulating member 65.

Others

In the rectangular secondary battery described in the present application, preferably, resin members may be used as the first insulating member and the second insulating member. The resin members may be made of polypropylene, polyethylene, polyphenylene sulfide, polyetheretherketone, a copolymer of tetrafluoroethylene and perfluoroalkoxyethylene, or the like.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A method of making a rectangular secondary battery including
   a rectangular housing that has an opening;
   a sealing plate that has a through-hole and that seals the opening;
   an electrode body that includes a positive electrode plate and a negative electrode plate and that is disposed in the rectangular housing;
   a terminal that is electrically connected to the positive electrode plate or the negative electrode plate and that is inserted into the through-hole of the sealing plate;
   an electroconductive member that is disposed between the sealing plate and the electrode body, that is electrically connected to the terminal, and that has an opening portion at an end thereof on the electrode body side;
   a inversion plate that seals the opening portion;
   a current collector that is electrically connected to the positive electrode plate or the negative electrode plate and that is connected to the inversion plate; and
   a first insulating member that is disposed between the inversion plate and the current collector,
   wherein the first insulating member has a through-hole,
   wherein the inversion plate and the current collector are connected to each other through the through-hole of the first insulating member,
   wherein the first insulating member and the current collector are fixed to each other,
   wherein the electroconductive member has a first outer side surface and a second outer side surface that face away from each other, and
   wherein the first insulating member includes a first pressing portion that is located outside of the first outer side surface and that presses the first outer side surface toward the second outer side surface and a second pressing portion that is located outside of the second outer side surface and that presses the second outer side surface toward the first outer side surface,
   wherein, when the pressure inside the rectangular housing reaches a predetermined value or higher, the inversion plate deforms and an electrical connection between the positive electrode plate or the negative electrode plate and the terminal is cut due to deformation of the inversion plate,
   the method comprising:
   a step of connecting the electroconductive member to the terminal,
   a step of sealing the opening portion of the electroconductive member with the inversion plate, a step of attaching the first insulating member to the electroconductive member, wherein, in a state before the first insulating member is attached to the electroconductive member, a distance between a part of the first insulating member to become the first pressing portion and a part of the first insulating member to become the second pressing portion is smaller than a distance between a part of the electroconductive member to be pressed by the first pressing portion and a part of the electroconductive member to be pressed by the second pressing portion.

2. The method of making a rectangular secondary battery according to claim 1, wherein, in the state before the first insulating member is attached to the electroconductive member, a distance X between the part of the first insulating member to become the first pressing portion and the part of the first insulating member to become the second pressing portion and a distance Y between the part of the electroconductive member to be pressed by the first pressing portion and the part to be pressed by the second pressing portion have a relationship $0.950 \leq X/Y < 1$.

3. The method of making a rectangular secondary battery according to claim 1, further comprising:

a step of inserting the terminal into the through-hole of the sealing plate and a through-hole of the electroconductive member; and a step of fastening the terminal onto the electroconductive member.

4. The method of making a rectangular secondary battery according to claim 1, further comprising:

wherein, the first insulating member includes:

a body; and a first side wall and a second side wall that protrude from the body toward the sealing plate;

the first side wall includes the first pressing portion;

the second side wall includes the second pressing portion; and the body of the first insulating member is disposed between the inversion plate and the current collector.

5. The method of making a rectangular secondary battery according to claim 4, wherein the first side wall and the second side wall each extends in a direction in which a shorter side of the sealing plate extends.

6. The method of making a rectangular secondary battery according to claim 4, wherein the first side wall and the second side wall each extends in a direction in which a longer side of the sealing plate extends.

7. The method of making a rectangular secondary battery according to claim 4, wherein, the first side wall includes a first protruding portion that protrudes toward the electroconductive member in a direction parallel to a longitudinal direction of the body;

the first pressing portion is located closer to the body than the first protruding portion is along the first side wall in a direction perpendicular to the longitudinal direction of the body;

the second side wall includes a second protruding portion that protrudes toward the electroconductive member in the direction parallel to the longitudinal direction of the body; and the second pressing portion is located closer to the body than the second protruding portion is along the second side wall in the direction perpendicular to the longitudinal direction of the body.

8. The method of making a rectangular secondary battery according to claim 1, further comprising:

a step of disposing a second insulating member between the sealing plate and the electroconductive member, a step of connecting the first insulating member and the second insulating member to each other.

9. The method of making a rectangular secondary battery according to claim 1, further comprising:

a step of inserting a projection of the first insulating member into a through-hole of the current collector.

10. The method of making a rectangular secondary battery according to claim 1, wherein, in the state before the first insulating member is attached to the electroconductive member, a distance X between the part of the first insulating member to become the first pressing portion and the part of the first insulating member to become the second pressing portion and a distance Y between the part of the electroconductive member to be pressed by the first pressing portion and the part to be pressed by the second pressing portion have a relationship $0.990 \leq X/Y \leq 0.999$.

11. A method of making a rectangular secondary battery including a rectangular housing that has an opening;

a sealing plate that has a through-hole and that seals the opening;

an electrode body that includes a positive electrode plate and a negative electrode plate and that is disposed in the rectangular housing;

a terminal that is electrically connected to the positive electrode plate or the negative electrode plate and that is inserted into the through-hole of the sealing plate;

an electroconductive member that is disposed between the sealing plate and the electrode body, that is electrically connected to the terminal, and that has an opening portion at an end thereof on the electrode body side;

a inversion plate that seals the opening portion;

a current collector that is electrically connected to the positive electrode plate or the negative electrode plate and that is connected to the inversion plate; and a first insulating member that is disposed between the inversion plate and the current collector, wherein the first insulating member has a through-hole, wherein the inversion plate and the current collector are connected to each other through the through-hole of the first insulating member, wherein the first insulating member and the current collector are fixed to each other, wherein the electroconductive member has a first outer side surface and a second outer side surface that face away from each other, and wherein the first insulating member includes a first pressing portion that is located outside of the first outer side surface and that presses the first outer side surface toward the second outer side surface and a second pressing portion that is located outside of the second outer side surface and that presses the second outer side surface toward the first outer side surface, wherein, the first insulating member includes:

a body; and a first side wall and a second side wall that protrude from the body toward the sealing plate;

the first side wall includes the first pressing portion;

the second side wall includes the second pressing portion; and the body of the first insulating member is disposed between the inversion plate and the current collector, wherein, when the pressure inside the rectangular housing reaches a predetermined value or higher, the inversion plate deforms and an electrical connection between the positive electrode plate or the negative electrode plate and the terminal is cut due to deformation of the inversion plate, the method comprising:

a step of attaching the first insulating member to the electroconductive member, wherein, in a state before the first insulating member is attached to the electroconductive member, a distance between a part of the first insulating member to become the first pressing portion and a part of the first insulating member to become the second pressing portion is smaller than a distance between a part of the electroconductive member to be pressed by the first pressing portion and a part of the electroconductive member to be pressed by the second pressing portion.

12. The method of making a rectangular secondary battery according to claim 11, further comprising:

a step of inserting the terminal into the through-hole of the sealing plate and a through-hole of the electroconductive member, and a step of fastening the terminal onto the electroconductive member.

13. The method of making a rectangular secondary battery according to claim 11, further comprising:

wherein the first side wall and the second side wall each extends in a direction in which a shorter side of the sealing plate extends.

14. The method of making a rectangular secondary battery according to claim 11, further comprising:

wherein the first side wall and the second side wall each extends in a direction in which a longer side of the sealing plate extends.

15. The method of making a rectangular secondary battery according to claim 11, wherein, the first side wall includes a first protruding portion that protrudes toward the electroconductive member in a direction parallel to a longitudinal direction of the body;

the first pressing portion is located closer to the body than the first protruding portion is along the first side wall in a direction perpendicular to the longitudinal direction of the body;

the second side wall includes a second protruding portion that protrudes toward the electroconductive member in the direction parallel to the longitudinal direction of the body; and the second pressing portion is located closer to the body than the second protruding portion is along the second side wall in the direction perpendicular to the longitudinal direction of the body.

16. The method of making a rectangular secondary battery according to claim 11, further comprising:

a step of disposing a second insulating member between the sealing plate and the electroconductive member, and a step of connecting the first insulating member and the second insulating member (17) to each other.

17. The method of making a rectangular secondary battery according to claim 11, further comprising:

a step of inserting a projection of the first insulating member into a through-hole of the current collector.

18. The method of making a rectangular secondary battery according to claim 11, wherein, in the state before the first insulating member is attached to the electroconductive member, a distance X between the part of the first insulating member to become the first pressing portion and the part of the first insulating member to become the second pressing portion and a distance Y between the part of the electroconductive member to be pressed by the first pressing portion and the part to be pressed by the second pressing portion have a relationship $0.990 \leq X/Y \leq 0.999$.

19. A method of making a rectangular secondary battery including a rectangular housing that has an opening;

a sealing plate that has a through-hole and that seals the opening;

an electrode body that includes a positive electrode plate and a negative electrode plate and that is disposed in the rectangular housing;

a terminal that is electrically connected to the positive electrode plate or the negative electrode plate and that is inserted into the through-hole of the sealing plate;

an electroconductive member that is disposed between the sealing plate and the electrode body, that is electrically connected to the terminal, and that has an opening portion at an end thereof on the electrode body side;

a inversion plate that seals the opening portion;

a current collector that is electrically connected to the positive electrode plate or the negative electrode plate and that is connected to the inversion plate; and a first insulating member that is disposed between the inversion plate and the current collector, wherein the first insulating member has a through-hole, wherein the inversion plate and the current collector are connected to each other through the through-hole of the first insulating member, wherein the first insulating member and the current collector are fixed to each other, wherein the electroconductive member has a first outer side surface and a second outer side surface that face away from each other, and wherein the first insulating member includes a first pressing portion that is located outside of the first outer side surface and that presses the first outer side surface toward the second outer side surface and a second pressing portion that is located outside of the second outer side surface and that presses the second outer side surface toward the first outer side surface, wherein, when the pressure inside the rectangular housing reaches a predetermined value or higher, the inversion plate deforms and an electrical connection between the positive electrode plate or the negative electrode plate and the terminal is cut due to deformation of the inversion plate, the method comprising:

a step of attaching the first insulating member to the electroconductive member, a step of sealing the opening portion of the electroconductive member with the inversion plate, wherein a flange portion is provided at the end of the electroconductive member at which the opening portion is disposed, wherein the step of attaching the first insulating member to the electroconductive member causes the first pressing portion and the second pressing portion to press an outer surface of the flange portion, wherein, in a state before the first insulating member is attached to the electroconductive member, a distance between a part of the first insulating member to become the first pressing portion and a part of the first insulating member to become the second pressing portion is smaller than a distance between a part of the electroconductive member to be pressed by the first pressing portion and a part of the electroconductive member to be pressed by the second pressing portion.

20. The method of making a rectangular secondary battery according to claim 19, further comprising,
   a step of inserting the terminal into the through-hole of the sealing plate and a through-hole of the electroconductive member, and
   a step of fastening the terminal onto the electroconductive member.

21. The method of making a rectangular secondary battery according to claim 19, wherein,
   the first insulating member includes:
      a body; and
      a first side wall and a second side wall that protrude from the body toward the sealing plate;
   the first side wall includes the first pressing portion;
   the second side wall includes the second pressing portion; and
   the body of the first insulating member is disposed between the inversion plate and the current collector.

\* \* \* \* \*